(12) United States Patent
Jiang et al.

(10) Patent No.: US 8,036,484 B2
(45) Date of Patent: Oct. 11, 2011

(54) IN-PLACE AVERAGING OF PACKED PIXEL DATA

(75) Inventors: Wenqing Jiang, San Jose, CA (US); Ying Cao, San Jose, CA (US); Li Hao, Cupertino, CA (US); Weiping Pan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1029 days.

(21) Appl. No.: 11/872,963

(22) Filed: Oct. 16, 2007

(65) Prior Publication Data

US 2009/0097771 A1    Apr. 16, 2009

(51) Int. Cl.
*G06K 9/40* (2006.01)

(52) U.S. Cl. ........ 382/264; 382/254; 382/260; 345/619; 345/643; 348/448; 348/463; 708/445

(58) Field of Classification Search .................. None
See application file for complete search history.

(56) References Cited

U.S. PATENT DOCUMENTS

| | | | | |
|---|---|---|---|---|
| 5,774,600 A | * | 6/1998 | Strongin et al. | 382/276 |
| 5,883,824 A | * | 3/1999 | Lee et al. | 708/445 |
| 6,512,523 B1 | * | 1/2003 | Gross | 345/606 |
| 7,035,331 B2 | * | 4/2006 | Liao et al. | 375/240.01 |
| 7,177,889 B2 | * | 2/2007 | Chatterjee | 708/300 |
| 7,558,816 B2 | * | 7/2009 | Saulsbury et al. | 708/445 |
| 7,636,746 B2 | * | 12/2009 | Chatterjee | 708/316 |

OTHER PUBLICATIONS

Maddocks et al. "Hunt Engineering VHDL Image Processing Source Modules Reference Manual", May 7, 2006, pp. 22, 28, 31, 33.*

* cited by examiner

*Primary Examiner* — Sath V Perungavoor
*Assistant Examiner* — Jason Heidemann
(74) *Attorney, Agent, or Firm* — Fiala & Weaver P.L.L.C.

(57) ABSTRACT

Methods, systems, and apparatuses for averaging data in packed format are provided. The data may be image data, such as data words containing color-specific data portions representative of pixels of a captured image. A first data word containing first image data is received. A second data word containing second image data is received. A logical AND of the first data word and the second data word is performed to generate a third data word. A logical exclusive OR (XOR) of the first data word and the second data word is performed to generate a fourth data word. A right shift of the fourth data word is performed. The third data word and the right shifted fourth data word are summed to generate a fifth data word that is an average of the first and second data words.

18 Claims, 11 Drawing Sheets

| PS11 | PS21 | PS31 | PS41 | PS51 | PS61 |
| PS12 | PS22 | PS32 | PS42 | PS52 | PS62 |
| PS13 | PS23 | PS33 | PS43 | PS53 | PS63 |
| PS14 | PS24 | PS34 | PS44 | PS54 | PS64 |
| PS15 | PS25 | PS35 | PS45 | PS55 | PS65 |
| PS16 | PS26 | PS36 | PS46 | PS56 | PS66 |

600

| 602 | | | | | 604 | | | | | | 606 | | | | |
|---|---|---|---|---|---|---|---|---|---|---|---|---|---|---|---|
| R5 15 | R4 14 | R3 13 | R2 12 | R1 11 | G6 10 | G5 9 | G4 8 | G3 7 | G2 6 | G1 5 | B5 4 | B4 3 | B3 2 | B2 1 | B1 0 |

1402 prior to performing a right shift of the fourth data word, change any right-most 1 bits of color-specific data portions of the fourth data word to 0 bits.

1602 prior to performing a right shift of the fourth data word, copy any right-most 1 bits of color-specific data portions of the fourth data word to a sixth data word

IN-PLACE AVERAGING OF PACKED PIXEL DATA

BACKGROUND OF THE INVENTION

1. Field of the Invention

The present invention relates to image data filtering.

2. Background Art

An increasing number of devices are being produced that are enabled to capture and display images. For example, mobile devices, such as cell phones, are increasingly being equipped with cameras to capture images, including still snapshots and motion video images. Images captured by such devices can frequently be viewed on displays of the devices, as well as being transferred from the devices for viewing elsewhere. To view the images on relatively small devices, the images typically must be viewed on small display screens that are not capable of viewing the full resolution of the captured images. Thus, such devices must include at least limited image processing capability to down-size the images for viewing on the small display screens.

Many mobile devices have limited processing capability due to cost, power consumption, and size constraints. However, the processing of captured images, especially the processing of video, is very computationally intensive. For example, many mobile devices have cameras capable of capturing images of 2 MegaPixels (MPel) or more. Thus, a processor of such a mobile device must be capable of processing a large amount of data for each captured image. Furthermore, encoding and decoding (e.g., QCIF) of image data may need to be performed by the processor at frame rates such as 15 fps and 30 fps, respectively, as well as the performance of other functions.

To deal with such high-resource demanding tasks, mobile device developers have resorted to including high-powered processing chips in the devices, which have higher clock rates and larger on-chip cache memory, or to including dedicated video/image processing chips. Such approaches result in higher cost devices with higher levels of power consumption, which may not be desirable in battery powered mobile devices.

Thus, ways are desired for handling an image processing workload in devices, such as mobile devices, without significantly raising device costs and power consumption levels.

BRIEF SUMMARY OF THE INVENTION

Methods, systems, and apparatuses for the averaging of packed data words are provided. The data words may contain any type of data, such as image data. Packed data words have multiple data portions. For a packed data word representative of a captured image pixel, the data portions may each relate to specific color data of the pixel. In aspects of the present invention, a pair of packed data words may be averaged together in packed format. This is an advantage over conventional averaging techniques, which must unpack and average each data portion separately.

In an example aspect, a first data word containing first image data is received. A second data word containing second image data is received. A logical AND of the first data word and the second data word is performed to generate a third data word. A logical exclusive OR (XOR) of the first data word and the second data word is performed to generate a fourth data word. A right shift of the fourth data word is performed. The third data word and the right shifted fourth data word are summed to generate a fifth data word that is an average of the first and second data words.

In one further example aspect, prior to performing the right shift of the fourth data word, right-most 1 bits of each color-specific data portion of the fourth data word may be changed to 0 bits. This eliminates unwanted shifting of 1 bits from one color-specific data portion to an adjacent color specific data portion.

In a still further aspect, the right-most 1 bits of each color-specific data portions of the fourth data word may be copied to a sixth data word prior to performing the right shift of the fourth data word. This may be performed to save fractional information that would otherwise be lost, and that may be used in subsequent averaging operations.

In another example aspect, a system for averaging image data information is provided. An AND logic is configured to perform a logical AND of a first data word containing first image data and a second data word containing second image data to generate a third data word. An exclusive OR (XOR) logic is configured to perform a logical XOR of the first data word and the second data word to generate a fourth data word. A right shifter is configured to perform a right shift of the fourth data. A summer is configured to sum the third data word and the right shifted fourth data word to generate a fifth data word that is an average of the first and second data words.

In a further example aspect, the system may include a bit mask logic coupled between the XOR logic and the right shifter. The bit mask logic is configured to mask any right-most 1 bits of color-specific data portions of the fourth data word to 0 bits.

In a still further aspect, the system may include a bit copy logic coupled to an output of the XOR logic. The bit copy logic is configured to copy any right-most 1 bits of color-specific data portions of the fourth data word to a sixth data word.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figures 1, 2:
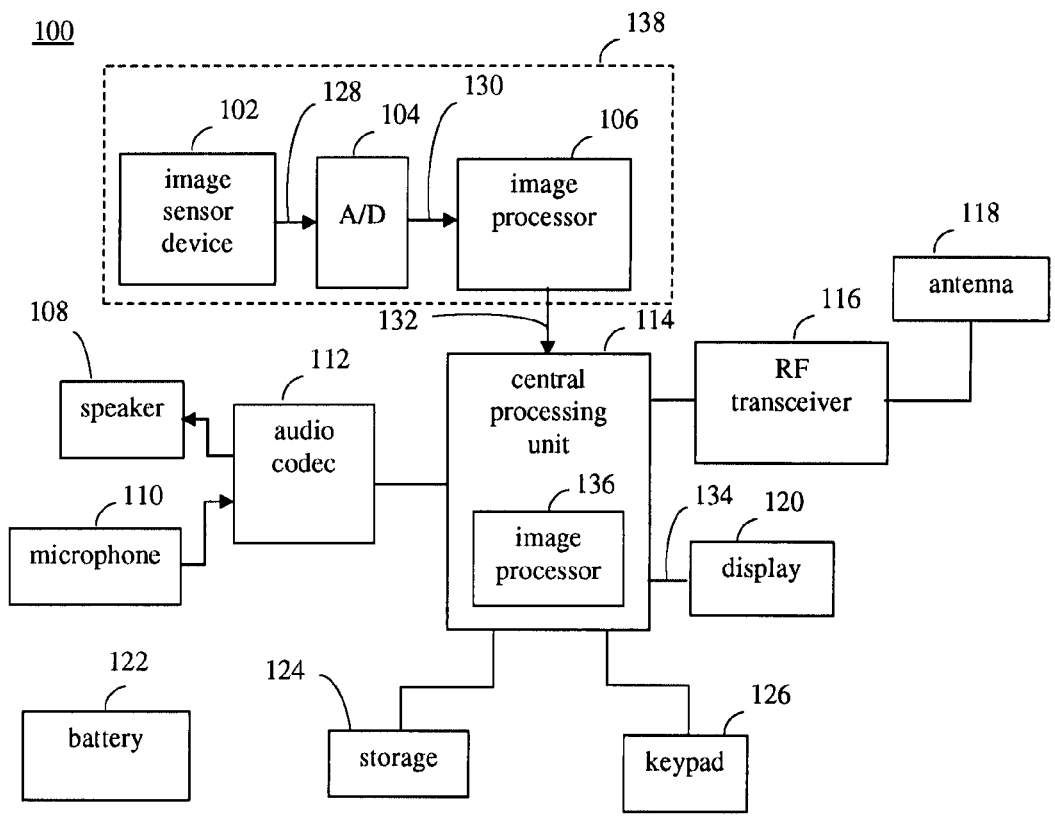
FIG. 1 shows a block diagram of an example mobile device with image capture and processing capability.
FIG. 2 shows a sensor array of an example image sensor device, having a two-dimensional array of pixel sensors.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Image Processing in Mobile Devices

Embodiments of the present invention relate to image processing performed in devices. For example, embodiments include mobile devices where image processing must be performed with limited resources. Types of such mobile devices include mobile phones (e.g., cell phones), handheld computing devices (e.g., personal digital assistants (PDAs), BLACKBERRY devices, PALM devices, etc.), handheld music players (e.g., APPLE IPODs, MP3 players, etc.), and further types of mobile devices. Such mobile devices may include a camera used to capture images, such as still images and video images. The captured images are processed internal to the mobile device.

FIG. 1 shows a block diagram of an example mobile device 100 with image capture and processing capability. Mobile device 100 may be a mobile phone, a handheld computing device, a music player, etc. The implementation of mobile device 100 shown in FIG. 1 is provided for purposes of illustration, and is not intended to be limiting. Embodiments of the present invention are intended to cover mobile devices having additional and/or alternative features to those shown for mobile device 100 in FIG. 1.

As shown in FIG. 1, mobile device 100 includes an image sensor device 102, an analog-to-digital (A/D) 104, an image processor 106, a speaker 108, a microphone 110, an audio codec 112, a central processing unit (CPU) 114, a radio frequency (RF) transceiver 116, an antenna 118, a display 120, a battery 122, a storage 124, and a keypad 126. These components are typically mounted to or contained in a housing. The housing may further contain a circuit board mounting integrated circuit chips and/or other electrical devices corresponding to these components. Each of these components of mobile device 100 is described as follows.

Battery 122 provides power to the components of mobile device 100 that require power. Battery 122 may be any type of battery, including one or more rechargeable and/or non-rechargeable batteries.

Keypad 126 is a user interface device that includes a plurality of keys enabling a user of mobile device 100 to enter data, commands, and/or to otherwise interact with mobile device 100. Mobile device 100 may include additional and/or alternative user interface devices to keypad 126, such as a touch pad, a roller ball, a stick, a click wheel, and/or voice recognition technology.

Image sensor device 102 is an image capturing device. For example, image sensor device 102 may include an array of photoelectric light sensors, such as a charge coupled device (CCD) or a CMOS (complementary metal-oxide-semiconductor) sensor device. Image sensor device 102 typically includes a two-dimensional array of sensor elements organized into rows and columns. For example, FIG. 2 shows a sensor array 200, which is an example of image sensor device 102, having a two-dimensional array of pixel sensors (PS). Sensor array 200 is shown in FIG. 2 as a six-by-six array of thirty-six (36) pixel sensors for ease of illustration. Sensor array 200 may have any number of pixel sensors, including hundreds of thousands or millions of pixel sensors. Each pixel sensor is shown in FIG. 2 as "PSxy", where "x" is a row number, and "y" is a column number, for any pixel sensor in the array of sensor elements. In embodiments, each pixel sensor of image sensor device 102 is configured to be sensitive to a specific color, or color range. In one example, three types of pixel sensors are present, including a first set of pixel sensors that are sensitive to the color red, a second set of pixel sensors that are sensitive to green, and a third set of pixel sensors that are sensitive to blue. Image sensor device 102 receives light corresponding to an image, and generates an analog image signal 128 corresponding to the captured image. Analog image signal 128 includes analog values for each of the pixel sensors.

Figure 3:
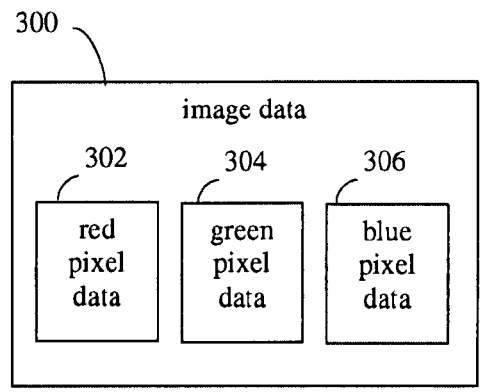
FIG. 3 shows a block diagram representation of image data included in an image signal for an image captured by an image sensor device.

A/D 104 receives analog image signal 128, converts analog image signal 128 to digital form, and outputs a digital image signal 130. Digital image signal 130 includes digital representations of each of the analog values generated by the pixel sensors, and thus includes a digital representation of the captured image. For instance, FIG. 3 shows a block diagram representation of image data 300 included in digital image signal 130 for an image captured by image sensor device 102. As shown in FIG. 3, image data 300 includes red pixel data 302, green pixel data 304, and blue pixel data 306. Red pixel data 302 includes data related to pixel sensors of image sensor device 102 that are sensitive to the color red. Green pixel data 304 includes data related to pixel sensors of image sensor device 102 that are sensitive to the color green. Blue pixel data 306 includes data related to pixel sensors of image sensor device 102 that are sensitive to the color blue.

Figure 4:
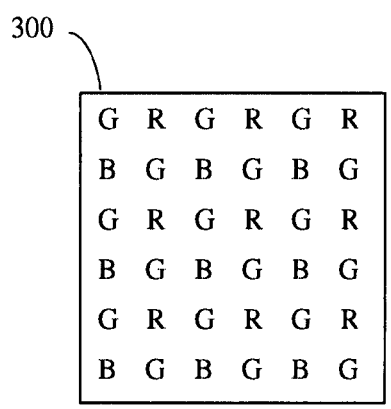
FIG. 4 illustrates image data in array form, as captured by an image sensor.

FIG. 4 illustrates image data 300 in array form, as captured by image sensor 102. In FIG. 4, "R" represents red pixel data captured by a corresponding pixel sensor of image sensor device 102, "G" represents green pixel data captured by a corresponding pixel sensor of image sensor device 102, and "B" represents blue pixel data captured by a corresponding pixel sensor of image sensor device 102. Referring back to FIG. 2, alternating pixel sensors PS11, PS31, and PS51 of the first row of sensor array 200 may be sensitive to green light, and thus may correspond to a "G" in FIG. 4, having generated green light data. Alternating pixel sensors PS21, PS41, and PS61 of the first row of sensor array 200 may be sensitive to red light, and thus may correspond to an "R" in FIG. 4, having generated red light data. In the second row of sensor array 200, alternating pixel sensors PS12, PS32, and PS52 may be sensitive to blue light, and thus may correspond to a "B" in FIG. 4, having generated blue light data. Alternating pixel sensors PS22, PS42, and PS62 of the second row of sensor array 200 may be sensitive to green light, and thus may correspond to a "G" in FIG. 4, having generated green light data. The color pattern of the first and second rows of sensor array 200 shown in FIG. 4 may be repeated in sensor array 200 for subsequent rows, as shown in FIG. 4.

The pixel pattern shown for image data 300 in FIG. 4 is called a Bayer pattern image. A Bayer filter mosaic is a color filter array (CFA) for arranging RGB color filters on the array of pixel sensors in image sensor device 102 to generate the Bayer pattern image. The Bayer pattern arrangement of color filters is used in many image sensors of devices such as digital cameras, camcorders, scanners, and mobile devices to create a color image. The filter pattern is 50% green, 25% red and 25% blue, hence is also referred to as "RGBG" or "GRGB." The green pixel sensors are referred to as "luminance-sensitive" elements, and the red and blue pixel sensors are referred to as "chrominance-sensitive" elements. Twice as many green pixel sensors are used as either of the red or blue pixel sensors to mimic the greater resolving power of the human eye with green light wavelengths. Alternatives to the Bayer pattern image may also be used, which include the CYGM filter (cyan, yellow, green, magenta) and RGBE filter (red, green, blue, emerald), which require demosaicing, and the Foveon X3 sensor, which layers red, green, and blue sensors vertically rather than using a mosaic.

Figure 5:
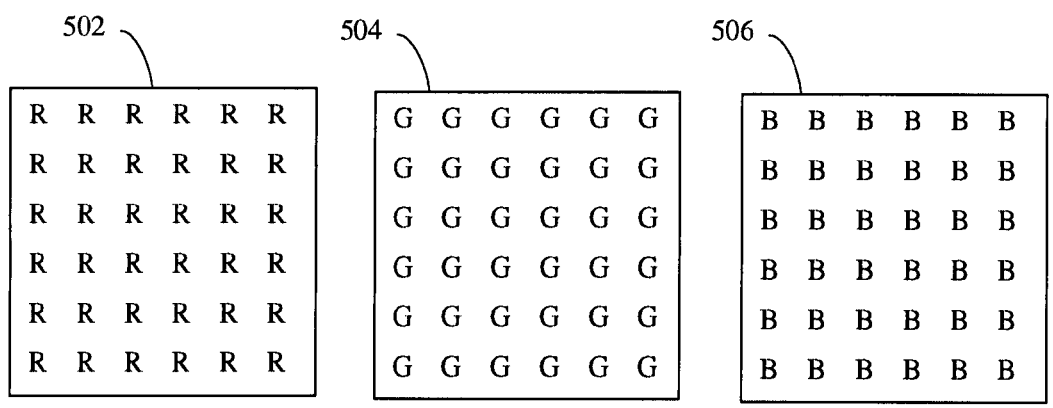
FIG. 5 shows example red, green, and blue color channels generated by an image processor from image data.

Image processor 106 receives digital image signal 130. Image processor 106 performs image processing of the digital pixel sensor data received in digital image signal 130. For example, image processor 106 may be used to generate pixels of all three colors at all pixel positions when a Bayer pattern image is output by image sensor device 102. Image processor 106 may perform a demosaicing algorithm to interpolate red, green, and blue pixel data values for each pixel position of the array of image data 200 shown in FIG. 2. For example, FIG. 5 shows a red color channel 502, a green color channel 504, and a blue color channel 506 generated by image processor 106 from image data 300. Each of red, green, and blue color channels 502, 504, and 506 includes a full array of image data for red, green, and blue, respectively, generated from image data 300 of FIG. 4. In other words, red color channel 502 includes a full array of red pixel data values, where a red pixel data value is generated for the position of each "G" and "B" pixel data value shown for image data 300 in FIG. 4, such as by averaging the values of the surrounding existing "R" pixel data values. In a likewise manner, a full array of green pixel data values is generated for green color channel 504 and a full array of blue pixel data values is generated for blue color channel 504. Thus, each of red, green, and blue color channels 502, 504, and 506 is an array of data values the size of the array of image data 300 shown in FIG. 4.

Image processor 106 performs processing of digital image signal 130, such as described above, and generates an image processor output signal 132. Image processor output signal 132 includes processed pixel data values that correspond to the image captured by image sensor device 102. Image processor output signal 132 includes color channels 502, 504, and 506, which each include a corresponding full array of pixel data values, respectively representing red, green, and blue color images corresponding to the captured image.

Note that in an embodiment, two or more of image sensor device 102, A/D 104, and image processor 106 may be included together in a single IC chip, such as a CMOS chip, particularly when image sensor device 102 is a CMOS sensor, or may be in two or more separate chips. For instance, FIG. 1 shows image sensor device 102, A/D 104, and image processor 106 included in a camera module 138, which may be a single IC chip in an example embodiment.

CPU 114 is shown in FIG. 1 as coupled to each of image processor 106, audio codec 112, RF transceiver 116, display 120, storage 124, and keypad 126. CPU 114 may be individually connected to these components, or one or more of these components may be connected to CPU 114 in a common bus structure.

Microphone 110 and audio CODEC 112 may be present in some applications of mobile device 100, such as mobile phone applications and video applications (e.g., where audio corresponding to the video images is recorded). Microphone 110 captures audio, including any sounds such as voice, etc. Microphone 110 may be any type of microphone. Microphone 110 generates an audio signal that is received by audio codec 112. The audio signal may include a stream of digital data, or analog information that is converted to digital form by an analog-to-digital (A/D) converter of audio codec 112. Audio codec 112 encodes (e.g., compresses) the received audio of the received audio signal. Audio codec 112 generates an encoded audio data stream that is received by CPU 114.

CPU 114 receives image processor output signal 132 from image processor 106 and receives the audio data stream from audio codec 112. As shown in FIG. 1, CPU 114 includes an image processor 136. In embodiments, image processor 136 performs image processing (e.g., image filtering) functions for CPU 114. In an embodiment, CPU 114 includes a digital signal processor (DSP), which may be included in image processor 136. When present, the DSP may apply special effects to the received audio data (e.g., an equalization function) and/or to the video data. CPU 114 may store and/or buffer video and/or audio data in storage 124. Storage 124 may include any suitable type of storage, including one or more hard disc drives, optical disc drives, FLASH memory devices, etc. In an embodiment, CPU 114 may stream the video and/or audio data to RF transceiver 116, to be transmitted from mobile device 100.

When present, RF transceiver 116 is configured to enable wireless communications for mobile device 116. For example, RF transceiver 116 may enable telephone calls, such as telephone calls according to a cellular protocol. RF transceiver 116 may include a frequency up-converter (transmitter) and down-converter (receiver). For example, RF transceiver 116 may transmit RF signals to antenna 118 containing audio information corresponding to voice of a user of mobile device 100. RF transceiver 116 may receive RF signals from antenna 118 corresponding to audio information received from another device in communication with mobile device 100. RF transceiver 116 provides the received audio information to CPU 114. In another example, RF transceiver 116 may be configured to receive television signals for mobile device 100, to be displayed by display 120. In another example, RF transceiver 116 may transmit images captured by image sensor device 102, including still and/or video images, from mobile device 100. In another example, RF transceiver 116 may enable a wireless local area network (WLAN) link (including an IEEE 802.11 WLAN standard link), and/or other type of wireless communication link.

CPU 114 provides audio data received by RF transceiver 116 to audio codec 112. Audio codec 112 performs bit stream decoding of the received audio data (if needed) and converts the decoded data to an analog signal. Speaker 108 receives the analog signal, and outputs corresponding sound.

Image processor 106, audio codec 112, and CPU 114 may be implemented in hardware, software, firmware, and/or any combination thereof. For example, CPU 114 may be implemented as a proprietary or commercially available processor, such as an ARM (advanced RISC machine) core configuration, that executes code to perform its functions. Audio codec 112 may be configured to process proprietary and/or industry standard audio protocols. Image processor 106 may be a proprietary or commercially available image signal processing chip, for example.

Display 120 receives image data from CPU 114, such as image data generated by image processor 106. For example, display 120 may be used to display images captured by image sensor device 102. Display 120 may include any type of display mechanism, including an LCD (liquid crystal display) panel or other display mechanism.

Depending on the particular implementation, image processor 106 formats the image data output in image processor output signal 132 according to a proprietary or known video data format. Display 120 is configured to receive the formatted data, and to display a corresponding captured image. In one example, image processor 106 may output a plurality of data words, where each data word corresponds to an image pixel. A data word may include multiple data portions that correspond to the various color channels for an image pixel. Any number of bits may be used for each color channel, and the data word may have any length.

Figures 6, 7:
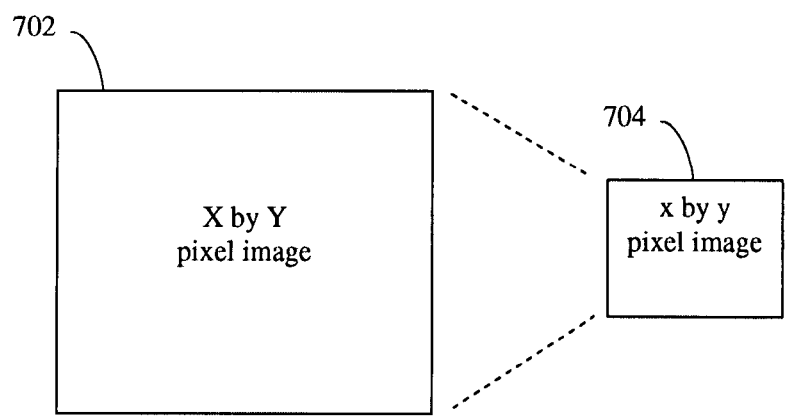
FIG. 6 shows an image data word formatted according to a standard implementation, containing 16-bits and including red, green, and blue color channel data.
FIG. 7 shows a block diagram representation of image downsizing.

For instance, in one standard implementation, the data word may be a 24-bit data word that includes 8 bits for the red color channel, 8 bits for the green color channel, and 8 bits for the blue color channel. In another standard implementation, as shown in FIG. 6, a data word 600 generated by image processor 106 may include 16-bits to represent an image pixel. As shown in FIG. 6, data word 600 includes 5 bits for the red color channel (R1-R5), shown as word portion 602, 6 bits for the green color channel (G1-G6), shown as word portion 604, and 5 bits for the blue color channel (B5-B1) shown as word portion 606. Word portion 602 (red) is packed in data word 600 as the highest order bits, word portion 604 (green) forms the middle order bits, and word portion 606 (blue) forms the lowest order bits. Note that these data word examples are provided for purposes of illustration, and that any data word format may be accommodated by embodiments of the present invention.

In some implementations, display 120 has a display screen that is not capable of viewing the full resolution of the images captured by image sensor device 102. Image sensor devices 102 may have various sizes, including numbers of pixels in the hundreds of thousand, or millions, such as 1 megapixel (Mpel), 2 Mpels, 4 Mpels, 8 Mpels, etc.). Display 120 may be capable of displaying relatively smaller image sizes. In one example, an image captured by image sensor device 102 may be 640 pixels by 480 pixels in size (307,200 pixels). In contrast, a display screen of display 120 may be 128 pixels by 96 pixels in size (12,288 pixels). Thus, display 120 (having a 12,288 pixel screen size) is not capable of displaying the entire captured image (having 307,200 pixels) at once.

To accommodate such differences between a size of display 120 and a size of captured images, CPU 114 (e.g., image processor 136) must down-size a captured image received from image processor 106 before providing the image to display 120. This is illustrated in FIG. 7, where an X by Y pixel image 702, captured by an image sensor, must be down-sized to an x by y pixel image 704, for display on the relatively small display screen of display 120 of mobile device 100. In the current example, CPU 114 must down-size the captured image by 25 times (307,200/12,288).

Such image downsizing may be performed by a subsampling process. In computer graphics, subsampling is a process used to reduce an image size. Subsampling is a type of image scaling, and may alter the appearance of an image or reduce the quantity of information required to store an image. Two types of subsampling are replacement and interpolation. The replacement technique selects a single pixel from a group and uses it to represent the entire group. The interpolation technique uses a statistical sample of the group (such as a mean) to create a new representation of the entire group.

In a subsampling process used in the current example, a captured image pixel array of 307,200 pixel data values may be divided into a plurality of 5 by 5 sections having 25 pixels each. An averaging function can be performed on the 25 pixel data values of each section to generate a single representative pixel for display for each section. In this manner, an averaged pixel is generated for each section of 25 pixels, creating an image of 12,288 averaged pixels for display by display 120. However, performing an averaging function on 25 pixel data values requires a large number of operations. For example, the following equation (Equation 1) represents an averaging function for a number P of pixels:

$$\text{Average} = \sum_{i=1}^{P} a_i PS_i \qquad \text{Equation 1}$$

where:
$a_i$=scaling/weighting factor for the ith pixel, and
$PS_i$=pixel data value the ith pixel.

For the current example of P=25 pixels, each $a_i$ may be equal to 1/25 for uniform averaging. In one implementation, a total of 49 operations must be performed to determine an average, including 25 multiplication operations and 24 addition operations. Each multiplication and addition operation may take more than one CPU cycle, leading to a fairly large number of operations required to process a single pixel data value. Furthermore, this averaging function must be performed 12,288 times to generate 12,288 average pixels. Still further, this averaging operation must be performed for every captured image frame in a captured video stream. Encoding and decoding (e.g., QCIF) functions may also need to be performed by CPU 114 on the video data, at frame rates such as 15 fps and 30 fps, respectively, as well as performing other functions required by CPU 114. The processing of captured images greatly adds to the workload of CPU 114.

To handle the increased processing load, mobile devices 100 typically are provided with high performance CPUs and/or special purpose image processing chips, which are expensive and consume greater amounts of power, in an undesired manner. Embodiments of the present invention overcome deficiencies of conventional mobile devices. Embodiments enable the down-sizing and display of captured images on mobile devices, while reducing CPU performance and power consumption requirements. Example embodiments are described in the following section.

Example Embodiments

The example embodiments described herein are provided for illustrative purposes, and are not limiting. The examples described herein may be adapted to any type of mobile device, fixed location devices, and to other device types. Furthermore, additional structural and operational embodiments, including modifications/alterations, will become apparent to persons skilled in the relevant art(s) from the teachings herein.

Embodiments relate to filtering operations performed on data, such as captured image data. Frequently, image data to be filtered comes in a packed format. Typical filtering applications must unpack the data before processing the data, which takes extra processing time. Embodiments of the present invention enable efficient processing of such packed format data, by actually processing the data while still in packed format.

Embodiments of the present invention are applicable to all packed data formats, including True color format, where 8 bits of each of red, green, and blue data are present. Another applicable example packed data format is called RGB565. RGB565 is frequently used in imaging applications as a display data format for low- to middle-tier display devices. In RGB565, red channel data takes 5 bits, green takes 6 bits and blue takes 5 bits. FIG. 6 shows data word 600 formatted according to RGB565. As shown in FIG. 6, one pixel of RGB565 data is packed into a single data word 600 having a length of 16 bits.

Image filtering applications frequently require averaging processes to be performed. For example, as described above with respect to FIG. 4, a demosaicing process for a Bayer image pattern may use pixel averaging to create additional pixels to fill each color channel. Furthermore, an image down-scaling process may average a group of neighboring pixels to generate a down-scaled pixel for a down-scaled image. Such averaging processes are typically performed by averaging a pair of pixels at a time, and recursively performing such averaging to average a larger group of pixels.

Figure 8:
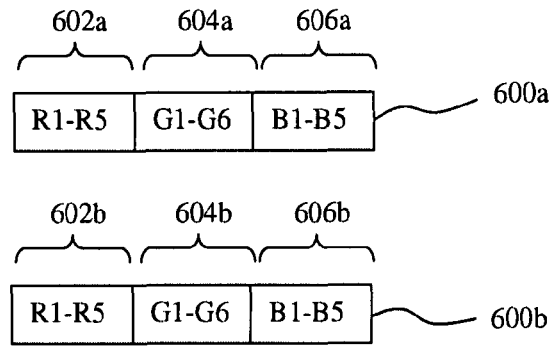
FIG. 8 shows a pair of data words containing image data in RGB565 format.

FIG. 8 shows a first data word 600a corresponding to image data for a first pixel, and a second data word 600b corresponding to image data for a second pixel. First and second data words 600a and 600b contain image data in RGB565 format. First data word 600a includes a first data portion 602a that includes 5 bits of red pixel data (R1-R5), a second data portion 604a that includes 6 bits of green pixel data (G1-G6), and a third portion 606a that includes 5 bits of blue pixel data (B1-B5). Second data word 600b includes a first data portion 602b that includes 5 bits of red pixel data (R1-R5), a second data portion 604b that includes 6 bits of green pixel data (G1-G6), and a third portion 606b that includes 5 bits of blue pixel data (B1-B5). First and second data words 600a and 600b may correspond to a pair of pixels present in a captured image that are to be averaged according to any sort of image processing (e.g., filtering) need.

Figure 9:
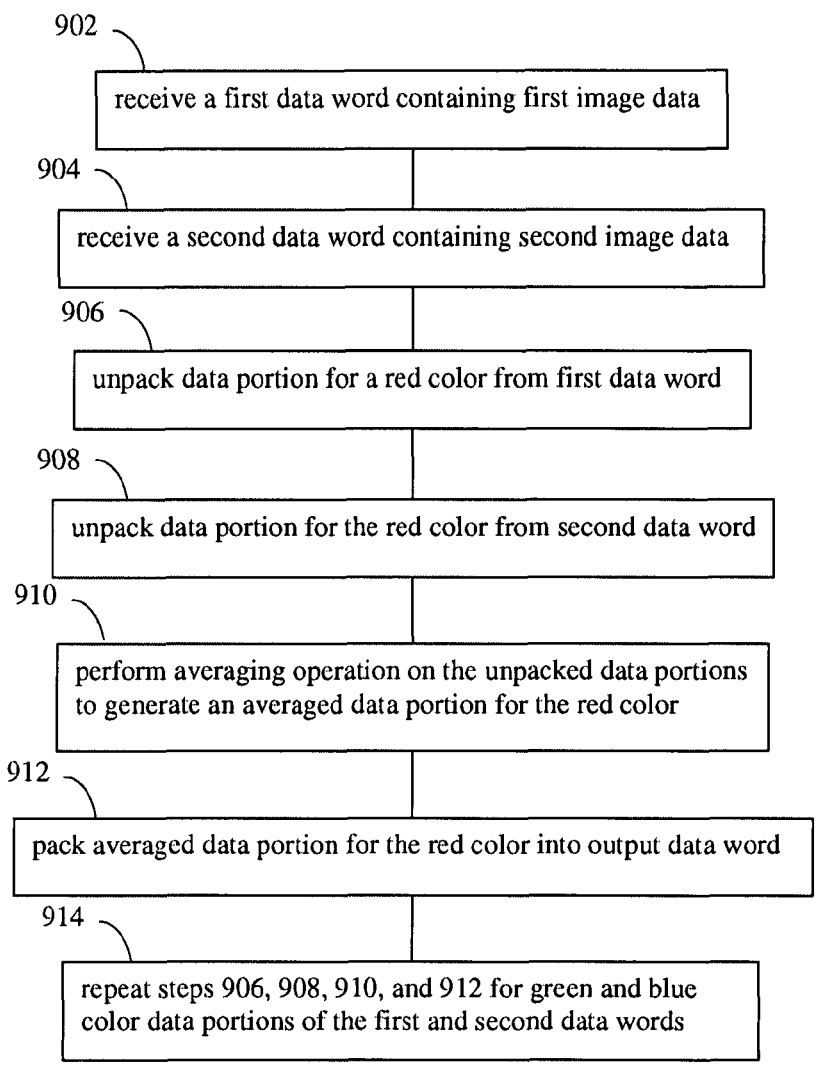
FIG. 9 shows a flowchart providing steps for averaging a pair of data words containing multi-color image data, according to a typical conventional data word averaging process.

FIG. 9 shows a flowchart 900 providing steps for averaging a pair of data words containing multi-color image data, such as data words 600a and 600b, according to a typical conventional data word averaging process. Flowchart 900 is described with respect to an image data averaging system 1000 shown in FIG. 10 for illustrative purposes. Flowchart 900 is described as follows.

In step 902, a first data word containing first image data is received. For example, the received first data word may be first data word 600a shown in FIG. 8. First data word 600a may be stored in a register.

In step 904, a second data word containing second image data is received. For example, the received second data word may be second data word 600b shown in FIG. 8. Second data word 600b may be stored in another register.

In step 906, a data portion for a red color is unpacked from a first data word. First data portion 602a of first data word 600a, having red color data, is unpacked from first data word 600a, and is copied to another register. First data portion 602a is right shifted to the right-most position of the register so that it may be processed. For example, first data portion 602a may be copied into, and right-shifted in a first register 1002, shown in FIG. 10.

In step 908, a data portion for the red color is unpacked from a second data word. Second data portion 602b of second data word 600b, having red color data, is unpacked from second data word 600b, and is copied to a fourth register. Second data portion 602b is right shifted to the right-most position of the register so that it may be processed. For example, first data portion 602b of second data word 600b may be copied into, and right-shifted in a second register 1004, shown in FIG. 10.

Figure 10:
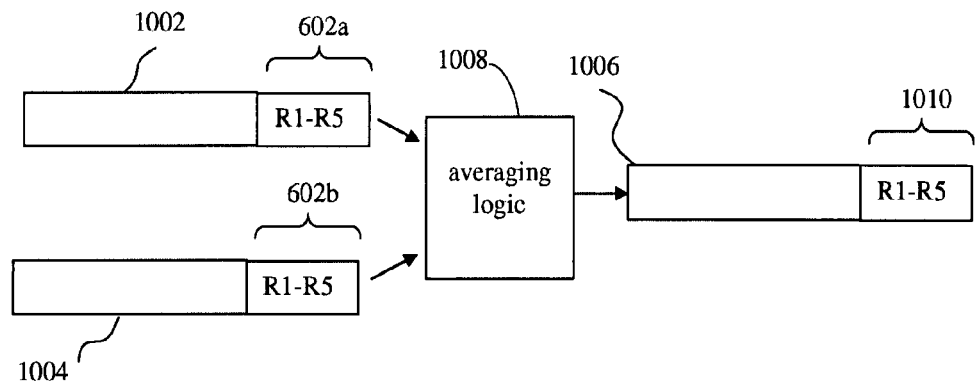
FIG. 10 shows a block diagram of a conventional image data averaging system.

In step 910, an averaging operation is performed on the unpacked data portions to generate an averaged data portion for the red color. For example, FIG. 10 illustrates operation of step 910 for red color data. As shown in FIG. 10, an averaging logic 1008 operates on data portions 602a and 602b in registers 1002 and 1004. Averaging logic 1008 is typically implemented in a processor. For example, averaging logic 1008 may be implemented in an ARM9 or other common processor type. Such common processors typically only support intrinsic 32 bits operations, and thus all registers, including registers 1002 and 1004, are 32-bits wide. Thus, even though data portions 602a and 602b are each only 5 bits in length, they are treated as 32-bit numbers. This is a significant waste of processing resources.

To generate an average of data portions 602a and 602b, averaging logic 1008 may perform a typical averaging operation, such as Equation 2 shown below:

$$\text{Average} = (\text{data portion } 602a + \text{data portion } 602b)/2 \qquad \text{Equation 2}$$

According to Equation 2, data portions 602a and 602b are summed. The resulting sum is divided by 2 to obtain an average data portion, which is for red data in this example.

In step 912, the averaged data portion for the red color is packed into an output data word. The average of data portions 602a and 602b (for red color) is left-shifted back to its packed position (shown in FIG. 6), and is packed into a third register 1006 as average red data portion 1010.

In step 914, steps 906, 908, 910, and 912 are repeated for green and blue color data portions of the first and second data words. For each color data portion of data words 600a and 600b, steps 906, 908, 910, and 912 of flowchart 900 must be repeated to generate an average. According to steps 906 and 908, each of red, green, and blue data portions 602a-606a and 602b-606b must be unpacked from their respective data word into one of registers 1002 and 1004 for separate processing. Red and green data portions 602a, 602b, 604a, and 604b are right-shifted in registers 1002 and 1004 prior to averaging. For step 910, averaging logic 1008 performs an averaging function according to Equation 2 to average each of data portion pairs 602a and 602b, 604a and 604b, and 606a and 606b. Each averaging function may take multiple processing cycles. For example, the addition process of Equation 2 may require one or more processing cycles, and the divide-by-2 process of Equation 2 may require one or more processing cycles. According to step 912, the averaged data portions resulting from step 910 for red, green, and blue are each individually packed into register 1006 (including the left-shifting of the red and green averaged data portions to their packed positions) to create an output average, multi-color RGB565 format data word representing a single image pixel.

Thus, conventionally generating an average for a pair of pixel data values is a computationally intensive process, requiring multiple data unpacking operations (for each color), right-shifting operations for red and green data, an averaging operation, left-shifting operations for the red and green data, and packing of each resulting average data portion into an output data word. Embodiments of the present invention more efficiently perform an averaging of pairs of data words, to save processing cycles and image processing time. In embodiments, data word averaging is performed in a packed manner, which eliminates data portion packing, right-shifting, left-shifting, and unpacking operations to reduce an overall processing load.

Figure 11:
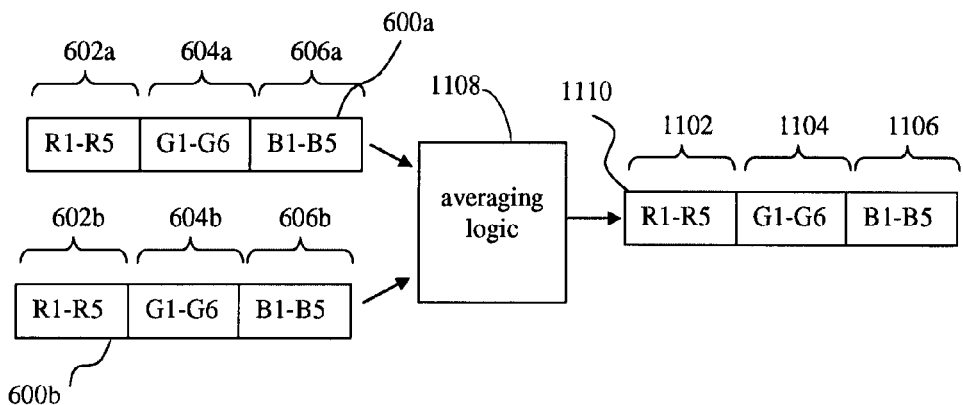
FIG. 11 shows a block diagram of a data word averaging system, according to an example embodiment of the present invention.

For example, FIG. 11 shows a data word averaging system 1100, according to an example embodiment of the present invention. As shown in FIG. 11, data word averaging system 1100 includes averaging logic 1108. Averaging logic 1108 receives data word 600a and data word 600b, generates an average of data word 600a and data word 600b, and outputs an average data word 1110. Averaging logic 1108 generates the average while data word 600a and data word 600b remain in a packed format. For example, as shown in FIG. 11, averaging logic 1108 operates on data portions 602a, 604a, and 606b of data word 600a and on data portions 602b, 604b, and 606b of data word 600b, without first unpacking the data portions and having to process the different color data portions separately. This is in contrast with averaging system 1000, where averaging logic 1008 must operate separately on red, green, and blue color data, each of which must be unpacked prior to averaging by averaging logic 1008, and re-packed after averaging.

Averaging logic 1108 generates average data word 1110, having a first portion 1102 containing an average of the red data portions 602a and 602b, a second portion 1104 containing an average of the green data portions 604a and 604b, and a third portion 1106 containing an average of the blue data portions 606a and 606b. Average data word 1110 is generated by averaging logic 1108 in a packed format, where data portions 1102, 1104, and 1106 are generated at the same time, and thus are not separately generated and packed one at a time.

Averaging logic 1108 may be implemented in hardware, software, firmware, or any combination thereof. For example, in an embodiment, averaging logic 1108 may be implemented as one or more blocks/modules of code that is executed by a processor, such as CPU 114 shown in FIG. 1. Alternatively, averaging logic 1108 may be implemented as hardware logic in an integrated circuit, such as an application specific integrated circuit (ASIC) that resides in a device.

Figure 12:
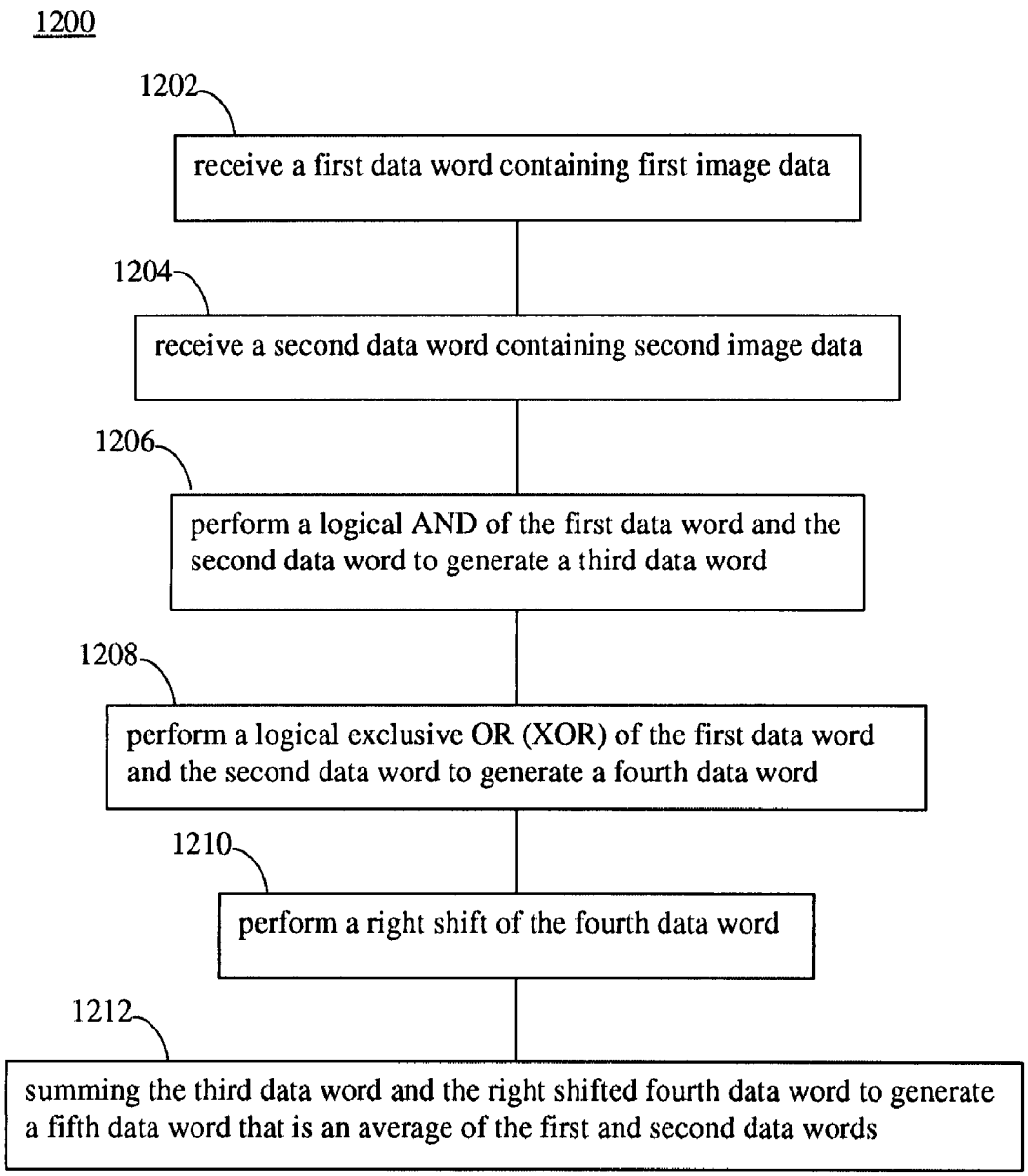
FIG. 12 shows a flowchart providing example steps for averaging data words, according to an example embodiment of the present invention.
Figure 13:
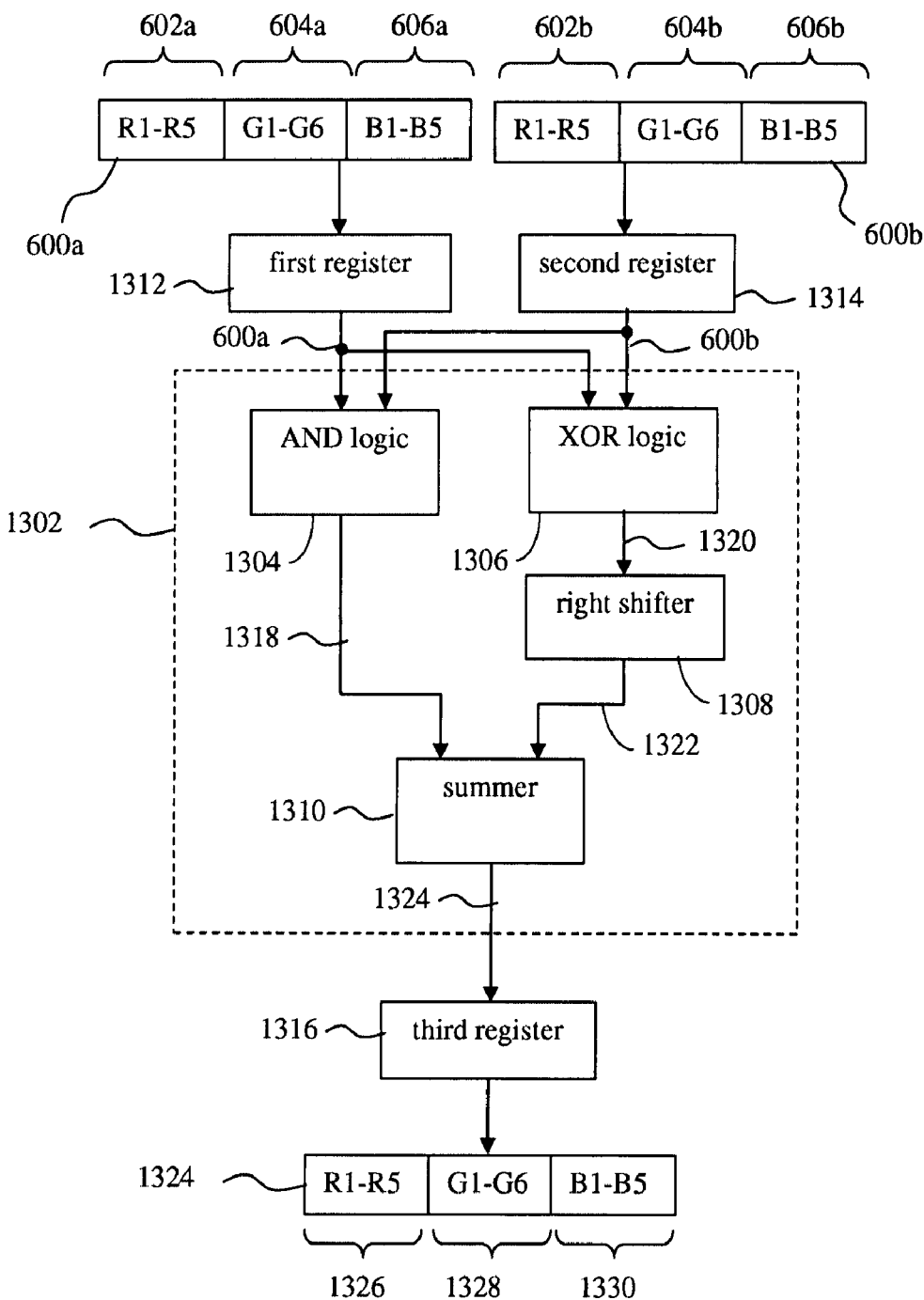
FIG. 13 shows a data word averaging system, which is an example of the data word averaging system of FIG. 11, according to an embodiment of the present invention.

FIG. 12 shows a flowchart 1200 providing example steps for averaging data words, according to an example embodiment of the present invention. For example, data word averaging system 1100 may operate according to flowchart 1200, in an embodiment. FIG. 12 is described with respect to FIG. 13 for illustrative purposes. FIG. 13 shows a data word averaging system 1300, which is an example of data word averaging system 1100, according to an embodiment of the present invention. Data word averaging system 1300 includes an averaging logic 1302, which is an example of averaging logic 1108 of FIG. 11. In FIG. 13, averaging logic 1302 includes an AND logic 1304, an XOR logic 1306, a right shifter 1308, and a summer 1310. Other structural and operational embodiments will be apparent to persons skilled in the relevant art(s) based on the discussion regarding flowchart 1200. Although flowchart 1200 is described below with regard to the averaging of packed image data, flowchart 1200 may also be applied to the averaging of other types of packed data, as would be known to persons skilled in the relevant art(s). Furthermore, although flowchart 1200 is mainly described below in terms of averaging RGB565 data words, flowchart 1200 may be applied to other image data formats. Flowchart 1200 is described as follows.

Flowchart 1200 begins with step 1202. In step 1202, a first data word containing first image data is received. For example, as shown in FIG. 13, first data word 600a is received by a first register 1312. First register 1312 stores first data word 600a.

In step 1204, a second data word containing second image data is received. As shown in FIG. 13, second data word 600b is received by a second register 1314. Second register 1314 stores second data word 600b. First and second registers 1312 and 1314 may be any type of storage, such as standard processor register banks. First and second registers 1312 and 1314 may have any length that is equal to or greater than a length of data words 600a and 600b. For example, when data words 600a and 600b are 24 bits in length (e.g., 8 bits of each of red, green, and blue color data), first and second registers 1312 and 1314 may be 24 bits or greater in length, such as standard 32 bit length registers. In another example, when data words 600a and 600b store RGB565 formatted data, first and second registers 1312 and 1314 may be 16 bits or greater in length, such as standard 16 bit or 32 bit length registers.

In step 1206, a logical AND of the first data word and the second data word is performed to generate a third data word. For example, as shown in FIG. 13, first and second data words 600a and 600b are received by AND logic 1304. AND logic 1304 performs a logical AND of bits of first data word 600a with corresponding bits of second data word 600b. In a logical AND function, for each bit position, an output 1 bit is generated if two input 1 bits are received. Otherwise, an output 0 bit is generated. When first and second data words 600a and 600b contain RGB565 data, as shown in FIG. 13, AND logic 1304 performs a logical AND of bit R1 of first data word 600a with bit R1 of second data word 600b, a logical AND of bit R2 of first data word 600a with bit R2 of second data word 600b, and so forth. Each red data bit, green data bit, and blue data bit of first data word 600a is ANDed with the corresponding red data bit, green data bit, and blue data bit of second data word 600b. AND logic 1304 generates a third data word 1318, which is a bitwise AND of first data word 600a and second data word 600b.

Examples of first and second data words 600a and 600b are shown below (in both decimal and binary form for ease of illustration) in RGB565 format:

|  | Decimal RGB565 | Binary RGB565 |
|---|---|---|
| first data word 600a | 5 50 3 | 00101 110010 00011 |
| second data word 600b | 23 58 13 | 10111 111010 01101 |

For these example input values, AND logic 1304 generates third data word 1318 to have the value shown below:

|  | Decimal RGB565 | Binary RGB565 |
|---|---|---|
| third data word 1318 | 5 50 1 | 00101 110010 00001 |

In step 1208, a logical exclusive OR (XOR) of the first data word and the second data word is performed to generate a fourth data word. For example, as shown in FIG. 13, first and second data words 600a and 600b are received by XOR logic 1306. XOR logic 1306 performs a logical XOR of bits of first data word 600a with corresponding bits of second data word 600b. In a logical XOR, for each bit position, an output 1 bit is generated if the two input bits are different. If the two input bits are the same, an output 0 bit is generated. When first and second data words 600a and 600b contain RGB565 data, as shown in FIG. 13, XOR logic 1306 performs a logical XOR of bit R1 of first data word 600a with bit R1 of second data word 600b, a logical XOR of bit R2 of first data word 600a with bit R2 of second data word 600b, and so forth. Each red data bit, green data bit, and blue data bit of first data word 600a is XORed with the corresponding red data bit, green data bit, and blue data bit of second data word 600b. XOR logic 1306 generates a fourth data word 1320, which is a bitwise XOR of first data word 600a and second data word 600b.

For instance, for the examples of first and second data words 600a and 600b provided above, XOR logic 1306 generates fourth data word 1320 to have the value shown below:

|  | Decimal RGB565 | Binary RGB565 |
|---|---|---|
| fourth data word 1320 | 18 8 14 | 10010 001000 01110 |

In step 1210, a right shift of the fourth data word is performed. For example, as shown in FIG. 13, fourth data word 1320 is received by right shifter 1308. Right shifter 1308 performs a one-bit right shift of bits of fourth data word 1320. Each red data bit, green data bit, and blue data bit of fourth data word 1320 is right shifted by one bit. Right shifter 1308 generates a right shifted version of fourth data word 1320, shown in FIG. 13 as right shifted fourth data word 1322.

For instance, for the example value of fourth data word provided above, right shifter 1308 generates right shifted fourth data word 1322 to have the value shown below:

|  | Decimal RGB565 | Binary RGB565 |
|---|---|---|
| RS fourth data word 1322 | 9 4 7 | 01001 000100 00111 |

In step 1212, the third data word and the right shifted fourth data word are summed to generate a fifth data word that is an average of the first and second data words. For example, as shown in FIG. 13, third data word 1318 and right shifted fourth data word 1322 are received by summer 1310. Summer 1310 performs a logical add of third data word 1318 and right shifted fourth data word 1322. Summer 1310 generates a fifth data word 1324, which is a sum of third data word 1318 and right shifted data word 1322.

For instance, for the example values of third data word 1318 and right shifted data word 1322 provided above, summer 1310 generates fifth data word 1324 to have the value shown below:

|  | Decimal RGB565 | Binary RGB565 |
|---|---|---|
| fifth data word 1324 | 14 54 8 | 01110 110110 01000 |

Fifth data word 1324 is an average of first and second data words 600a and 600b, for each color data portion. As shown in FIG. 13, fifth data word 1324 is stored in third register 1316 in a packed format. Fifth data word 1324 is shown as having a first data portion 1326 that is five bits of averaged red color data (R1-R5), a second data portion 1328 that is six bits of averaged green color data (G1-G6), and a third data portion 1330 that is five bits of averaged blue color data (B1-B5).

In the above example, fifth data word 1324 contains averaged values for each of the red, green, and blue data portions of first and second data words 600a and 600b. In the current example, first data portion 1326 contains 14 (decimal), second data portion 1328 contains 54 (decimal), and third data portion 1330 contains 8 (decimal). For illustrative purposes, the average values of each of the example values for the red, green, and blue data portions of first and second data words 600a and 600b are shown below calculated according to conventional Equation 2, as follows:

$$\text{red portion average} = \left(\begin{array}{l}\text{red data portion } 602a + \\ \text{red data portion } 602b\end{array}\right) \Big/ 2$$

$$= (5+23)/2 = 14$$

$$\text{green portion average} = \left(\begin{array}{l}\text{green data portion } 604a + \\ \text{green data portion } 604b\end{array}\right) \Big/ 2$$

$$= (50+58)/2 = 54$$

$$\text{blue portion average} = \left(\begin{array}{l}\text{blue data portion } 606a + \\ \text{blue data portion } 606b\end{array}\right) \Big/ 2$$

$$= (3+13)/2 = 8$$

The average values calculated conventionally according to Equation 2 (Red=14, Green=54, Blue=8) match the average values generated according to system 1300 shown in FIG. 3. However, as described above, system 1300 has the benefit of not requiring the unpacking and packing of the data portions of each color. Such unpacking and repacking of the data portions is required by conventional averaging systems (e.g., system 1000), and thus the embodiment of FIG. 13 can perform averaging of two data words with fewer processing cycles.

Averaging logic 1302 of FIG. 13 may provide undesirable results when a data portion of a particular color of one of data words 600a and 600b contains an odd value, but the corresponding data portion of the other of data words 600a and 600b contains an even value. In such a situation, fourth data word 1320 will include a 1 bit in a right-most bit position of the data portion corresponding to the particular color. Right shifter 1308 will shift the 1 bit from the data portion of the particular color into an adjacent data portion to the right, or will shift the 1 bit from fourth data word 1320 entirely (if the data portion is the right-most data portion of the data word).

Figures 14, 15:
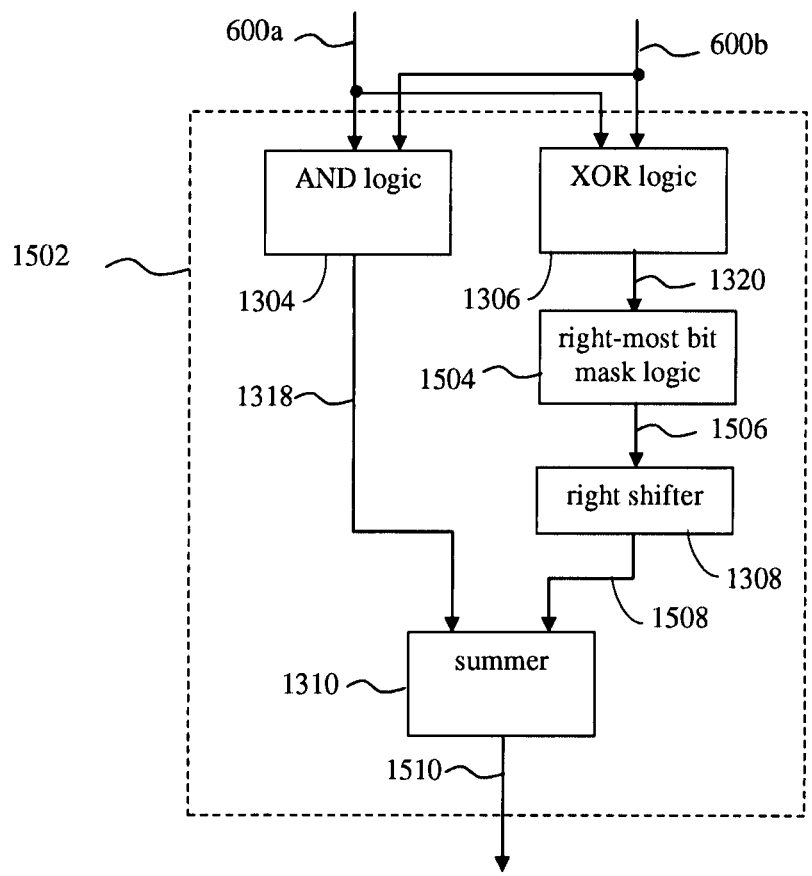
FIG. 14 shows a step that may be performed in the flowchart of FIG. 12, according to an example embodiment of the present invention.
FIG. 15 shows averaging logic, which is an example of the averaging logic shown in FIG. 11, according to an embodiment of the present invention.

FIG. 14 shows a step 1402 that may be incorporated into flowchart 1200 to avoid this undesirable result. In step 1402, prior to performing a right shift of the fourth data word, any right-most 1 bits of color-specific data portions of the fourth data word are changed to 0 bits. Any right-most bits of the color specific portions of fourth data portion 1320 that are equal to 1 are changed to 0 bits. This can be performed in any manner, using bit-masking logic or other types of logic, as would be known to persons skilled in the relevant art(s).

For example, in an embodiment, averaging logic 1502 shown in FIG. 15 may perform step 1402. Averaging logic 1502 is another example of averaging logic 1108 shown in FIG. 11. As shown in FIG. 15, averaging logic 1502 is configured similarly to averaging logic 1302 of FIG. 13, with the addition of right-most bit mask logic 1504. Bit mask logic 1504 is coupled between the XOR logic 1320 and right shifter 1308. Bit mask logic 1504 is configured to mask any right-most 1 bits of color-specific data portions of fourth data word 1320 to 0 bits.

An example of the operation of averaging logic 1502 with bit mask logic 1504 is illustrated below, using the following example value of first and second data words 600a and 600b (shown in both decimal and binary form) in RGB565 format:

|  | Decimal RGB565 | Binary RGB565 |
|---|---|---|
| first data word 600a | 4 51 2 | 00100 110011 00010 |
| second data word 600b | 23 58 13 | 10111 111010 01101 |

The green data portion (51) of first data word 600a is odd (has a 1 bit in its right-most bit position), and the red data portion (23) and blue data portion (13) of second data word 600b are odd. The other data portions are even. Using these example values as inputs, AND logic 1304 generates third data word 1318 to have the value shown below:

|  | Decimal RGB565 | Binary RGB565 |
|---|---|---|
| third data word 1318 | 4 50 0 | 00100 110010 00000 |

Furthermore, XOR logic 1306 generates fourth data word 1320 to have the value shown below:

|  | Decimal RGB565 | Binary RGB565 |
|---|---|---|
| fourth data word 1320 | 19 9 15 | 10011 001001 01111 |

As shown above, each color specific data portion of fourth data word 1320 has a 1 bit in the right-most position (e.g., a red portion having a value of 19, a green portion having a value of 9, and a blue portion having a value of 15).

If fourth data word 1320 shown above is right shifted by one bit, a non-zero bit of the red portion would be shifted into the green portion, a non-zero bit of the green portion would be shifted into the blue portion, and a non-zero bit of the blue portion would be shifted out of fourth data word 1320. To prevent this, bit mask logic 1504 masks any right-most 1 bits of color-specific data portions of fourth data word 1320 to 0 bits. For example, bit mask logic 1504 may apply the following bit mask to fourth data word 1320:

|  | Decimal RGB565 | Binary RGB565 |
|---|---|---|
| bit mask | 30 62 30 | 11110 111110 11110 |
| fourth data word 1320 | 19 9 15 | 10011 001001 01111 |

The bit mask shown above is ANDed with fourth data word 1320 by bit mask logic 1504 to generate the following bit masked version of fourth data word 1320, referred to as bit masked fourth data word 1506:

|  | Decimal RGB565 | Binary RGB565 |
|---|---|---|
| BM fourth data word 1506 | 18 8 14 | 10010 001000 01110 |

Bit mask logic 1320 changes the right-most bit of each color data portion to a 0 bit. Right shifter 1308 receives bit masked fourth data word 1506 and performs the right shift on bit masked fourth data word 1506. Right shifter 1308 generates a right shifted fourth data word 1508 to have the decimal and binary values shown below:

|  | Decimal RGB565 | Binary RGB565 |
|---|---|---|
| RS fourth data word 1508 | 9 4 7 | 01001 000100 00111 |

For these example values of third data word 1318 and right shifted data word 1508, summer 1310 generates a fifth data word 1510 having the value shown below:

|  | Decimal RGB565 | Binary RGB565 |
|---|---|---|
| fifth data word 1324 | 13 54 7 | 01110 110110 01000 |

Fifth data word 1510 is a non-fractional average of first and second data words 600a and 600b, for each color data portion. Because bit mask logic 1320 changes the right-most bit of each color data portion of fourth data word 1320 to a 0 bit, a fractional portion of the average of each color data portion is lost. To illustrate this, Equation 2 is used below to generate a conventional average of each of the red, green, and blue data portions of first and second data words 600a and 600b, as follows, for the current example:

$$\text{red portion average} = \left(\begin{array}{c}\text{red data portion } 602a + \\ \text{red data portion } 602b\end{array}\right) \Big/ 2$$

$$= (4 + 23)/2 = 13.5$$

$$\text{green portion average} = \left(\begin{array}{c}\text{green data portion } 604a + \\ \text{green data portion } 604b\end{array}\right) \Big/ 2$$

$$= (51 + 58)/2 = 54.5$$

$$\text{blue portion average} = \left(\begin{array}{c}\text{blue data portion } 606a + \\ \text{blue data portion } 606b\end{array}\right) \Big/ 2$$

$$= (2 + 13)/2 = 7.5$$

Each of these average values generated by Equation 2 has a fractional portion—0.5, as well as a non-fractional portion (e.g., 13, 54, and 7). Averaging logic 1502 is configured to generate the non-fractional portion, while removing the fractional portion. Thus, averaging module 1502 may be used in embodiments where there is tolerance for some inaccuracy, where a fractional portion of an average is not needed.

Figures 16, 17:
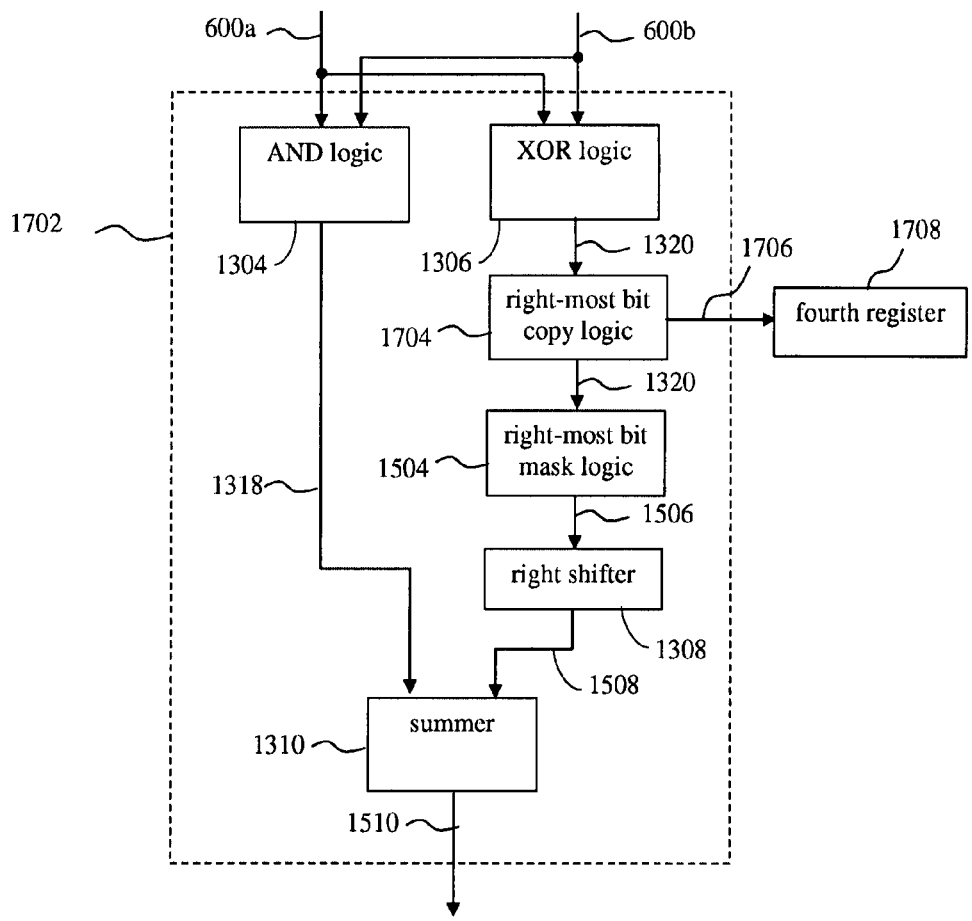
FIG. 16 shows a step that may be performed in the flowchart of FIG. 12, according to an example embodiment of the present invention.
FIG. 17 shows averaging logic, which is an example of the averaging logic shown in FIG. 11, according to an embodiment of the present invention.

FIG. 16 shows a step 1602 that may be incorporated into flowchart 1200 to avoid the undesirable results of averaging logic 1302 shown in FIG. 13. In an embodiment, step 1602 of FIG. 16 may be used in addition to step 1402 of FIG. 14. Step 1602 enables the fractional portion of the average of each color data portion to be saved. In step 1602, prior to performing a right shift of the fourth data word, any right-most 1 bits of color-specific data portions of the fourth data word are copied to a sixth data word. Any right-most bits of the color specific portions of fourth data portion 1320 that are equal to 1 are saved. In this manner, the bits can be used later, if desired, to maintain a higher level of accuracy during the averaging process. These bits can be saved in any manner, using masking logic or other types of logic, as would be known to persons skilled in the relevant art(s).

For example, in an embodiment, an averaging logic 1702 shown in FIG. 17 may perform step 1602. Averaging logic 1702 is another example of averaging logic 1108 shown in FIG. 11. As shown in FIG. 17, averaging logic 1702 is configured similarly to averaging logic 1502 of FIG. 15, with the addition of right-most bit copy logic 1704. Bit copy logic 1704 is coupled between the XOR logic 1320 and right-most bit mask logic 1504. Bit copy logic 1704 is configured to copy any right-most 1 bits of color-specific data portions of fourth data word 1320 to a sixth data word 1706. Sixth data word 1706 is stored in a fourth register 1708. For instance, according to the example values shown above, sixth data word 1706 may have the following contents:

|  | Decimal RGB565 | Binary RGB565 |
| --- | --- | --- |
| fourth data word 1320 | 19 9 15 | 10011 001001 01111 |
| sixth data word 1706 | 1 1 1 | 00001 000001 00001 |

In this example, because each color-specific data portion of fourth data word 1320 includes a right-most 1 bit, sixth data word 1706 receives a 1 bit in each data portion.

Bit copy logic 1704 may be configured in various ways to perform its functions. For example, in an embodiment, bit copy logic 1704 may apply the following bit mask to fourth data word 1320:

|  | Decimal RGB565 | Binary RGB565 |
| --- | --- | --- |
| bit mask | 1 1 1 | 00001 000001 00001 |

The bit mask shown above is ANDed with fourth data word 1320 by bit copy logic 1704 to generate sixth data word 1706. Alternatively, bit copy logic 1704 may be configured in other ways.

By containing the right-most 1 bits of color-specific data portions of fourth data word 1320, sixth data word 1706 can contain a fractional portion of each color specific data portion of the generated average (fifth data word 1510). For instance, for the example average data portion values described above with respect to FIG. 15 (red=13, green=54, blue=7), sixth data word 1706 may include the right-most 1 bit of each color-specific data portion (later masked out by bit mask logic 1504), representing an additional 0.5 fractional portion for each color specific data portion.

AND logic 1304, XOR logic 1306, bit copy logic 1704, bit mask logic 1504, right shifter 1308, and summer 1310 may each be implemented in hardware, software, firmware, or any combination thereof. For example, in an embodiment, AND logic 1304, XOR logic 1306, bit copy logic 1704, bit mask logic 1504, right shifter 1308, and summer 1310 may be implemented as one or more blocks/modules of code that is executed by a processor, such as CPU 114 shown in FIG. 1. Alternatively, AND logic 1304, XOR logic 1306, bit copy logic 1704, bit mask logic 1504, right shifter 1308, and summer 1310 may be implemented as hardware logic in an integrated circuit, such as an application specific integrated circuit (ASIC) that resides in a device.

The above described flowcharts and averaging logic embodiments may be used in a recursive fashion to average/low-pass filter groups of more than two pixels. The flowcharts and averaging logic embodiments may be arranged in any recursive fashion, as would be apparent to persons skilled in the relevant art(s). A particular recursive arrangement may give each input data word equal weighting, or different weighting, depending on the recursive configuration.

Figure 18:
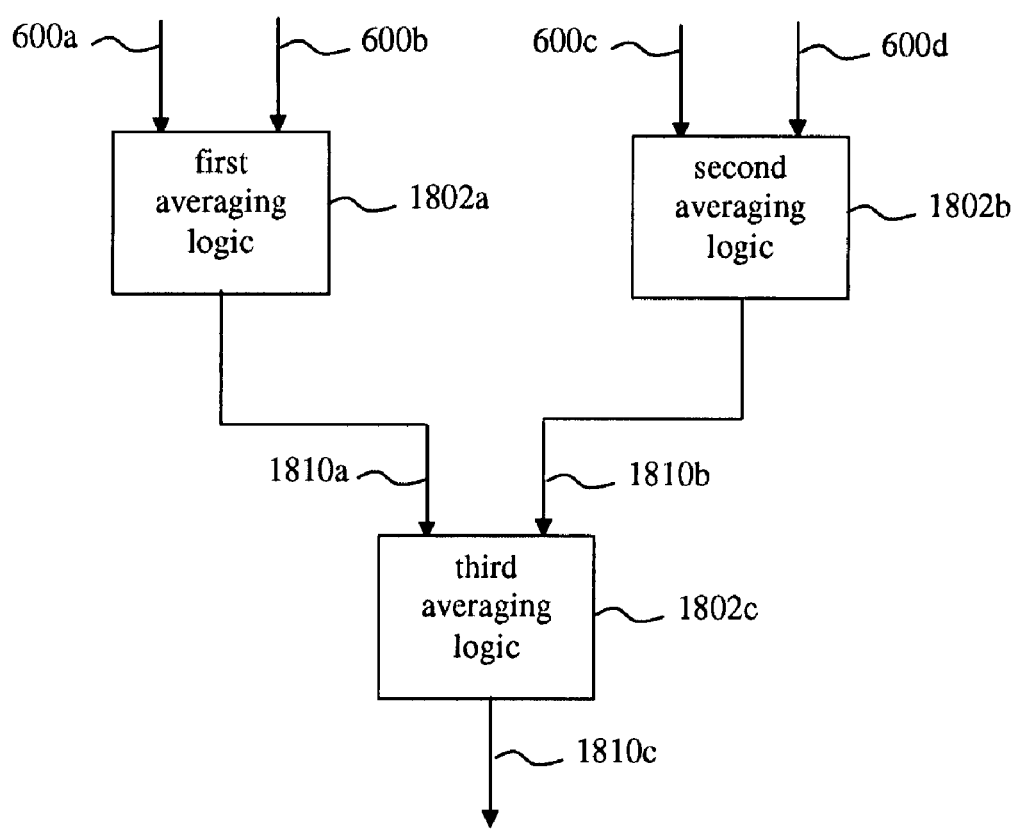
FIGS. 18 and 19 show example systems configured to average four data words, according to embodiments of the present invention.

For example, FIG. 18 shows a system 1800 configured to average four data words 600a-600d, each including multi-color image data separated into distinct data portions (e.g., as shown for data word 600 in FIG. 6). For example, data words 600a-600d may each correspond to a separate image pixel in a same or different captured image. For instance, the pixels corresponding to data words 600a-600d may be four pixels surrounding a fifth pixel location. Data words 600a-600d may be averaged to generate pixel information for the fifth pixel location. In embodiments, data words 600a-600d may be positioned relative to each other in any spatial and/or temporal manner.

System 1800 includes a first averaging logic 1802a, a second averaging logic 1804a, and a third averaging logic 1810c. Averaging logics 1802a-1802c can be the same averaging logic used in a recursive fashion to implement system 1800, or can be separate averaging logic blocks configured as shown. Averaging logics 1802a-1802c can be any of averaging logics 1108, 1302, 1502, and 1702 shown in FIGS. 11, 13, 15, and 17.

As shown in FIG. 18, first averaging logic 1802a receives first and second data words 600a and 600b, and generates a first averaged data word 1810a. Second averaging logic 1802b receives third and fourth data words 600c and 600d, and generates a second averaged data word 1810b. Third averaging logic 1802c receives first and second averaged data words 1810a and 1810b, and generates a third averaged data word 1810c. Third averaged data word 1810c contains multiple data portions corresponding to different colors. Each data portion is an average of the corresponding data portions of all four of data words 600a-600d.

Figure 19:
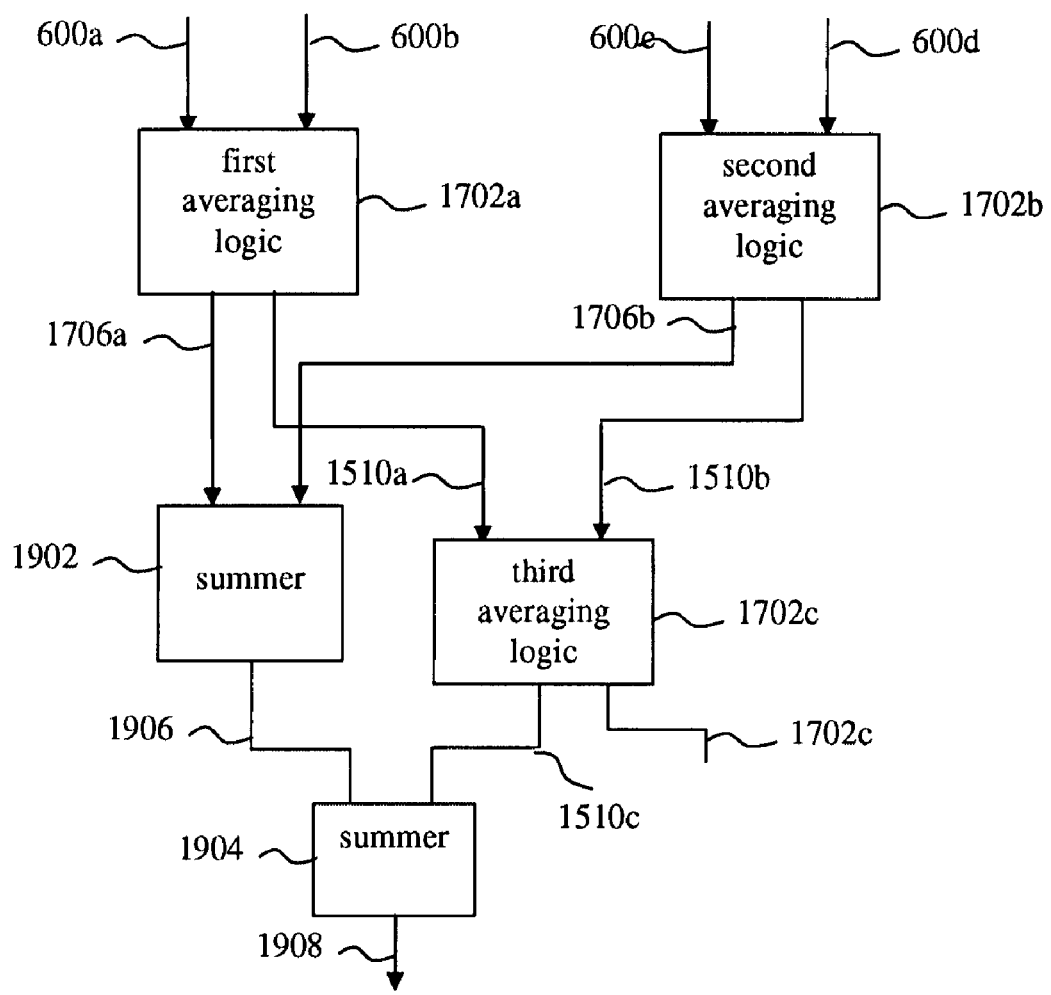

FIG. 19 shows a system 1900 configured to average four data words 600a-600d, similarly to system 1800 of FIG. 18. In system 1900, first through third averaging logics 1702a-1702c are present, which each generate a respective (non-fractional) average data word 1510a-1510c and a respective fractional data word 1706, as described above with respect to FIG. 17. System 1900 averages data words 600a-600d, generating an average that includes fractional and non-fractional average portions.

As shown in FIG. 19, first averaging logic 1702a receives first and second data words 600a and 600b, and generates a first averaged data word 1510a and a first fractional data word 1706a. Second averaging logic 1702b receives third and fourth data words 600c and 600d, and generates a second averaged data word 1510b and a second fractional data word 1706b. Third averaging logic 1702c receives first and second averaged data words 1510a and 1510b, and generates a third averaged data word 1510c. Third averaged data word 1510c does not take into account fractional portions of the prior two averaging operations.

A first summer 1902 receives first and second fractional data words 1706a and 1706b, and generates a summed fractional data word 1906. A second summer 1904 receives summed fractional data word 1906, and third averaged data word 151c. In an embodiment, second summer 1904 is configured to determine a non-fractional portion of summed fractional data word 1906. For example, in an embodiment, second summer 1904 may perform a bit-wise AND between of first and second fractional data words 1706a and 1706b to determine the non-fractional portion of summed fractional data word 1906. Second summer 1904 sums the determined non-fractional portion of summed fractional data word 1906 with third averaged data word 1510c to generate a fourth averaged data word 1908. Fourth averaged data word 1908 may be a more accurate average of data words 600a-600d than is third averaged data word 1510c, because it sums in a non-fractional portion (if one exists) of a sum of the fractional portions of the averaging operations provided by first and second averaging logics 1702a and 1702b. Second summer 1904 may be configured to determine a fractional portion of summed fractional data word 1906, and to retain the fractional portion for subsequent averaging operations, if desired.

Example Software Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system and to storing software in a computer system or other device. The invention, in an embodiment, is directed to such computer program products.

In an embodiment where aspects of the present invention are implemented using software/firmware, the software/firmware may be stored in a computer program product and loaded into a computer system or other device using a removable storage drive, hard drive, or communications interface. The computer system or other device may execute the software/firmware from storage such as a hard drive or memory device (e.g., a ROM device such as an electrically erasable ROM, electrically programmable ROM, a RAM device such as a static RAM, dynamic RAM, etc.). This control logic software/firmware, when executed by a processor, causes the processor to perform the functions of the invention as described herein.

According to an example embodiment, a mobile device may execute computer-readable instructions to performing averaging functions, as further described elsewhere herein (e.g., as described with respect to flowchart 1200 of FIG. 12), and as recited in the claims appended hereto.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for averaging image data information, comprising:
   receiving a first data word containing first image data;
   receiving a second data word containing second image data;
   performing a logical AND of the first data word and the second data word to generate a third data word;
   performing a logical exclusive OR (XOR) of the first data word and the second data word to generate a fourth data word;
   performing a right shift of the fourth data word; and
   summing the third data word and the right shifted fourth data word to generate a fifth data word that is an average of the first and second data words.

2. The method of claim 1, further comprising:
   prior to said performing a right shift of the fourth data word,
   changing any right-most 1 bits of color-specific data portions of the fourth data word to 0 bits.

3. The method of claim 1, further comprising:
   prior to said performing a right shift of the fourth data word,
   copying any right-most 1 bits of color-specific data portions of the fourth data word to a sixth data word, and
   changing any right-most 1 bits of the color-specific data portions of the fourth data word to 0 bits.

4. The method of claim 3, wherein the sixth data word is a fractional portion of average of the first and second data words, the method further comprising:
   performing the logical AND, the logical XOR, the copying, the changing, the right shift, and the summing with regard to an additional pair of received data words to generate an seventh data word that is a non-fractional portion of the average of the additional pair of received data words and to generate a fractional portion of the average of the additional pair of received data words;
   determining an average of the fifth data word and the seventh data word, including the steps of
   determining a non-fractional portion of a sum of the sixth data word and the fractional portion of the average of the additional pair of received data words,
   performing the logical AND, the logical XOR, the copying, the changing, the right shift, and the summing with regard to the fifth and seventh data words to generate an eighth data word, and summing the eighth data word and the determined non-fractional portion.

5. The method of claim 1, further comprising:
receiving a sixth data word containing third image data;
receiving an seventh data word containing fourth image data;
performing a logical AND of the sixth data word and the seventh data word to generate an eighth data word;
performing a logical exclusive OR (XOR) of the sixth data word and the seventh data word to generate a ninth data word;
performing a right shift of the ninth data word; and
summing the eighth data word and the right shifted ninth data word to generate a tenth data word that is an average of the sixth and seventh data words.

6. The method of claim 5, further comprising:
performing a logical AND of the fifth data word and the tenth data word to generate an eleventh data word;
performing a logical exclusive OR (XOR) of the fifth data word and the tenth data word to generate a twelfth data word;
performing a right shift of the twelfth data word; and
summing the eleventh data word and the right shifted twelfth data word to generate a thirteenth data word that is an average of the fifth and tenth data words.

7. The method of claim 1, further comprising:
recursively performing the logical AND, the logical XOR, the right shift, and the summing on at least one additional received data word and the fifth data word to generate at least one additional average.

8. The method of claim 1, wherein said receiving a first data word containing first image data comprises:
receiving the first data word containing the first image data including a first red data portion, a first green data portion, and a first blue data portion; and
wherein said receiving a second data word containing second image data comprises:
receiving the second data word containing second image data including a second red data portion, a second green data portion, and a second blue data portion.

9. The method of claim 8, wherein the first and second red data portions are five bits in length, the first and second green data portions are six bits in length, and the first and second blue data portions are five bits in length.

10. A system comprising a processor for averaging image data information, comprising:
an AND logic configured to perform a logical AND of a first data word containing first image data and a second data word containing second image data to generate a third data word;
an exclusive OR (XOR) logic configured to perform a logical XOR of the first data word and the second data word to generate a fourth data word;
a right shifter configured to perform a right shift of the fourth data; and
a summer configured to sum the third data word and the right shifted fourth data word to generate a fifth data word that is an average of the first and second data words.

11. The system of claim 10, further comprising:
a bit mask logic coupled between the XOR logic and the right shifter, wherein the bit mask logic is configured to mask any right-most 1 bits of color-specific data portions of the fourth data word to 0 bits;
wherein the right shifter is configured to perform the right shift on the bit masked fourth data word.

12. The system of claim 10, further comprising:
a bit copy logic coupled to an output of the XOR logic, wherein the bit copy logic is configured to copy any right-most 1 bits of color-specific data portions of the fourth data word to a sixth data word, and
a bit mask logic coupled between the XOR logic and the right shifter, wherein the bit mask logic is configured to mask any right-most 1 bits of color-specific data portions of the fourth data word to 0 bits;
wherein the right shifter is configured to perform the right shift on the bit masked fourth data word.

13. The system of claim 12, wherein the sixth data word is a fractional portion of average of the first and second data words, further comprising:
a second summer; and
a third summer;
wherein the AND logic, the XOR logic, the bit copy logic, the bit mask logic, the right shifter, and the first summer are configured with regard to an additional pair of received data words to generate a seventh data word that is a non-fractional portion of the average of the additional pair of received data words and to generate a fractional portion of the average of the additional pair of received data words;
wherein the AND logic, the XOR logic, the bit copy logic, the bit mask logic, the right shifter, and the first summer are configured with regard to the fifth data word and the seventh data word to generate an eighth data word;
wherein the second summer is configured to sum the sixth data word and the fractional portion of the average of the additional pair of received data words; and
wherein the third summer is configured to sum the eighth data word and a non-fractional portion of the sum of the sixth data word and the fractional portion of the average of the additional pair of received data words.

14. The system of claim 10, wherein the image data includes a first red data portion, a first green data portion, and a first blue data portion; and
wherein the second image data includes a second red data portion, a second green data portion, and a second blue data portion.

15. The system of claim 14, wherein the first and second red data portions are five bits in length, the first and second green data portions are six bits in length, and the first and second blue data portions are five bits in length.

16. A computer program product comprising a non-transitory computer usable medium having computer readable program code means embodied in said medium for averaging image data information, comprising:
a first computer readable program code means for enabling a processor to perform a logical AND of a first data word and a second data word to generate a third data word, wherein the first data word contains first image data and the second data word contains second image data;
a second computer readable program code means for enabling a processor to perform a logical exclusive OR (XOR) of the first data word and the second data word to generate a fourth data word;
a third computer readable program code means for enabling a processor to perform a right shift of the fourth data word; and
a fourth computer readable program code means for enabling a processor to sum the third data word and the right shifted fourth data word to generate a fifth data word that is an average of the first and second data words.

17. The computer program product of claim 16, further comprising:

a fifth computer readable program code means for enabling a processor to change any right-most 1 bits of color-specific data portions of the fourth data word to 0 bits prior to the third computer readable program code means performing the right shift of the fourth data word.

18. The computer program product of claim 16, further comprising:

a fifth computer readable program code means for enabling a processor to copy any right-most 1 bits of color-specific data portions of the fourth data word to a sixth data word prior to the third computer readable program code means performing the right shift of the fourth data word; and a sixth computer readable program code means for enabling a processor to change any right-most 1 bits of the color-specific data portions of the fourth data word to 0 bits prior to the third computer readable program code means performing the right shift of the fourth data word.

\* \* \* \* \*